C. R. STEPHENS.
PLOW.
APPLICATION FILED APR. 20, 1912.
1,104,569.
Patented July 21, 1914.
2 SHEETS—SHEET 1.
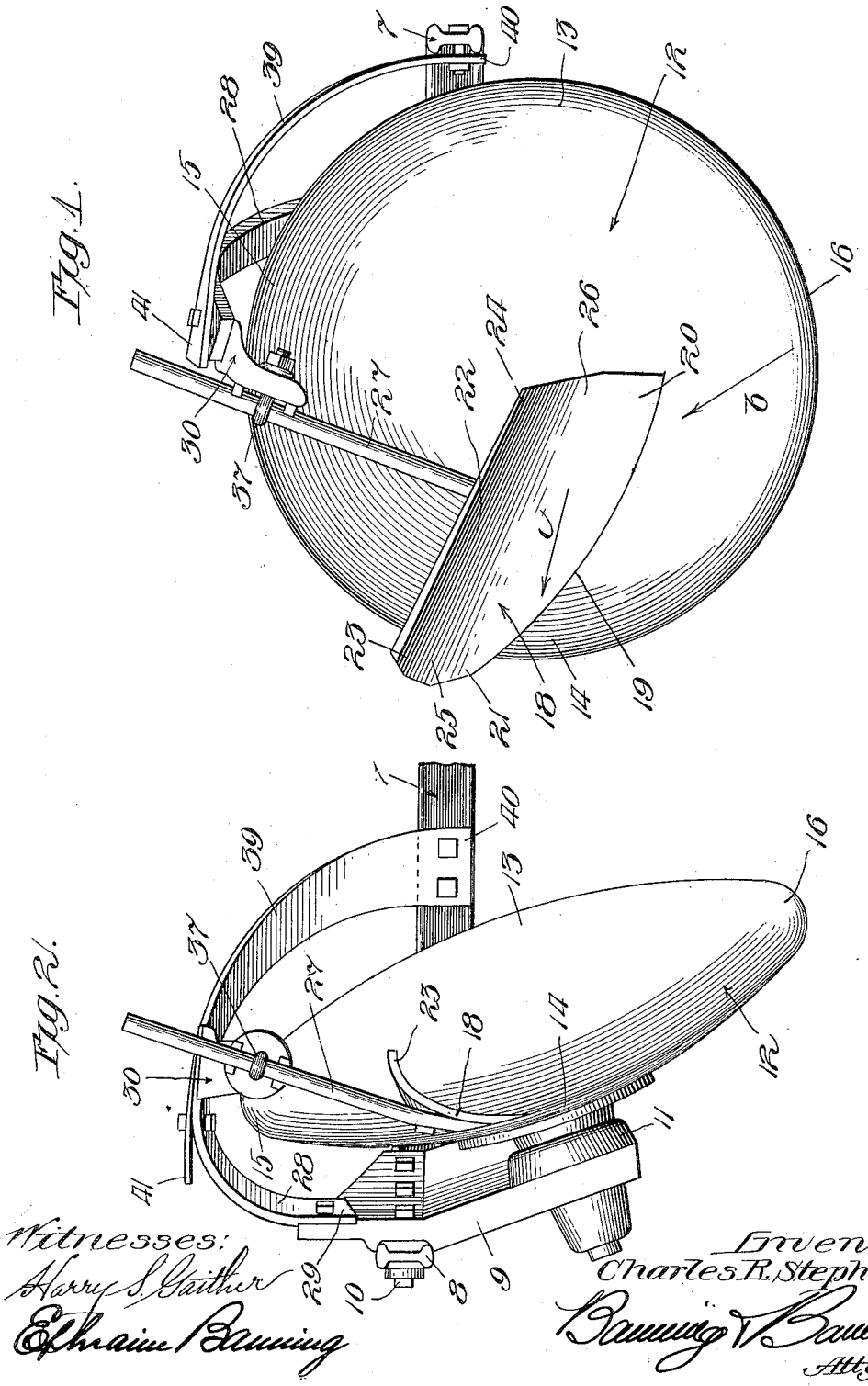

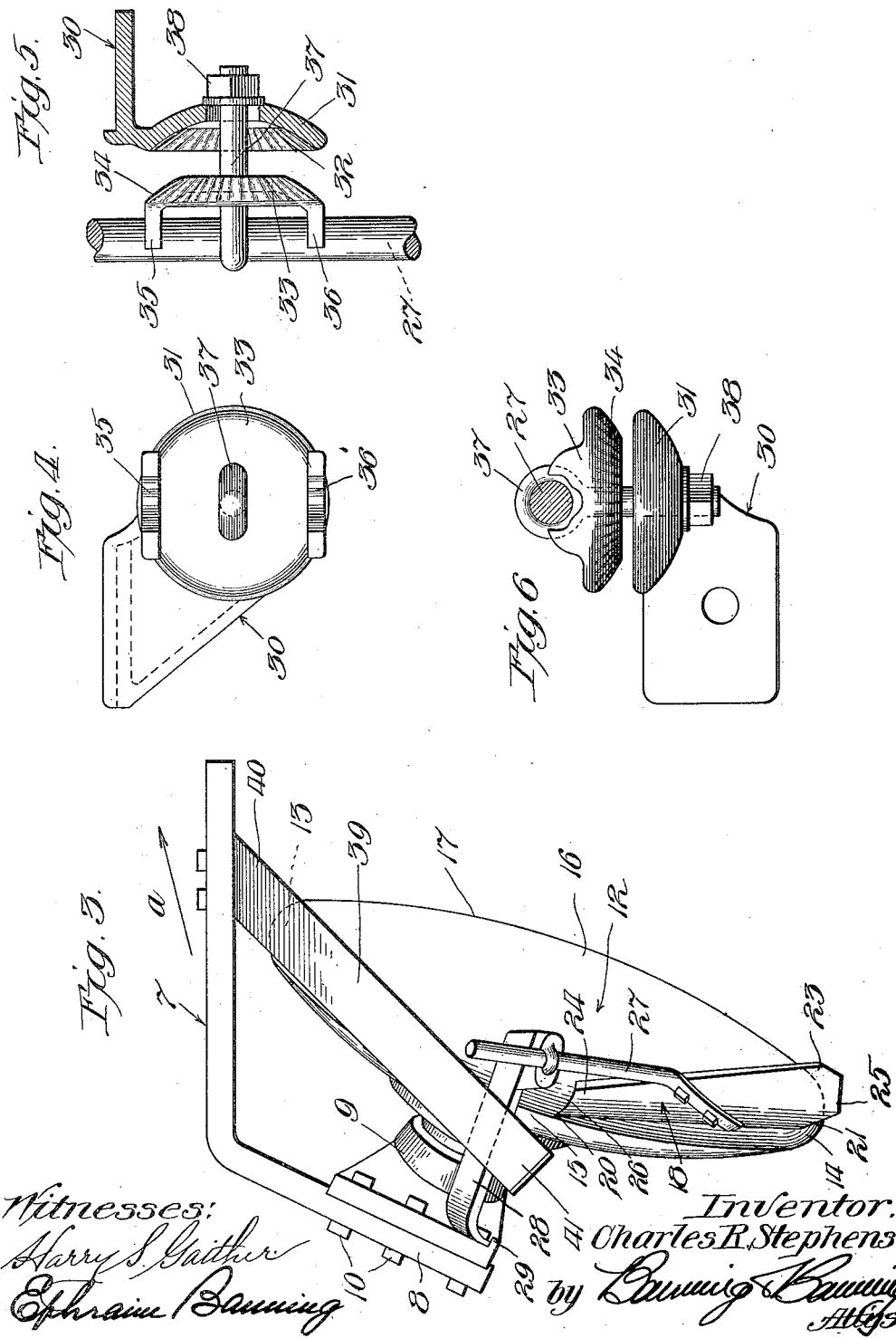

UNITED STATES PATENT OFFICE.

CHARLES R. STEPHENS, OF MOLINE, ILLINOIS, ASSIGNOR TO THE MOLINE PLOW COMPANY, OF MOLINE, ILLINOIS, A CORPORATION OF ILLINOIS.

PLOW.

1,104,569.

Specification of Letters Patent.   Patented July 21, 1914.

Application filed April 20, 1912.   Serial No. 691,984.

*To all whom it may concern:*

Be it known that I, CHARLES R. STEPHENS, a citizen of the United States, residing at Moline, in the county of Rock Island and State of Illinois, have invented certain new and useful Improvements in Plows, of which the following is a specification.

This invention has reference to plows of the form ordinarily known as disk-plows. Such plows comprise one or more disks, each of which is ordinarily of dish-shape; and such disks perform their plowing action by being drawn through the ground when set at the proper angle with respect to the line of draft and to the vertical. The angle at which each disk is supported as it is drawn forward is determined somewhat by the character of the soil which is being acted upon and by the depth and character of the furrow which is being plowed. As a general rule, each disk is set with its upper edge inclined backwardly and diagonally to the line of draft. In most characters of soil, it is necessary that some form of scraper be used in conjunction with the disks of the plow, as otherwise they will become clogged with dirt or trash and cease to cut desirable furrows, even if they do not become wholly inoperative. Ordinarily a disk-plow will not only break up the soil to the full depth of the furrow, but will also carry up a large portion of the lower or bottom soil to the top and turn it over so as to leave it as the upper or top covering of the plowed ground—that is to say, such a plow will turn or upset the major portion of the entire furrow slice cut or removed by the disk. There are times, however, when it is undesirable to upset or turn over all of the soil of the furrow slice, and particularly so when deep furrows are being plowed, because, as a rule, the subsoil, or the soil in the bottom or lower portion of the furrow, lacks certain elements in the form of plant food, and is to a certain extent "dead," as it may be termed. This is because it has not been exposed to the air and sunshine. The benefit which comes from deep plowing in such cases is the loosening up or breaking up and pulverizing of the subsoil, thus enabling the plants, such as sugar-beets, for example, to more easily penetrate into it while deriving their nourishment from near the top, and, at the same time, gradually bringing the lower or subsoil into those conditions that will eventually cause it to become fertile and nutritious. From the above it will be seen that to secure the best results in deep plowing, the subsoil or lower layers of the earth should be loosened and broken up or disintegrated, but should not be turned over nor brought prematurely to the surface. Therefore, the ordinary disk-plow as at present used presents the disadvantages that it not only loosens up the subsoil, but upsets or turns it over and brings it to the surface, where it is not wanted, while at the same time turning under and burying the surface soil to such a depth that its useful properties are rendered unavailable.

The main object of this invention is to provide a disk-plow for deep plowing and to associate with the same some element, such as a scraper or other device, so formed and arranged that it shall prevent the lower layers of soil from being brought to the surface and turned over onto the top of the plowed ground, but at the same time will permit the disk to perform its function of breaking and pulverizing the lower layers of soil as well as the upper while turning over only the upper portion of the furrow slice, and thus keeping it on top of the plowed and pulverized ground.

Another object of my invention is to associate the scraper or other device with the disk in such a way that no matter what the depth of the furrow may be which is being turned at any given time, it will be possible to regulate or adjust the depth or thickness of the upper layer of the furrow slice, which will be upset or turned over and left on top of the pulverized bed or mass, by adjusting the scraper or scraping device up or down with respect to the diameter of the disk, so as to turn or upset only a desired thickness or portion of the furrow slice.

Another object of my invention is to form the scraper or disk-cleaning device of such a peculiar shape as that it will turn over the desired top layer or portion of the furrow slice with a natural mold-board-like action, thus distributing evenly that portion of the furrow cut, predetermined to turn, over the unturned lower portion of the furrow cut. In this process all surface verdure or fertilizer may be evenly covered at a predetermined depth.

Other objects and uses will appear from a detailed description of the invention, which consists in the features of construction and combination of parts hereinafter described and claimed.

Referring now to the drawings, Figure 1 shows a vertical face view or front elevation of a disk-plow provided with one form of my soil-turning scraper; Fig. 2 is a vertical perspective view of the parts shown in Fig. 1 and brings out more clearly the curved or mold-board form of the scraper by which the upper portion of the furrow slice is turned over or upset; Fig. 3 shows a plan view of the parts illustrated in Fig. 1, as they appear from above; Fig. 4 shows a side view or face view of the bracket, whereby the mold-board scraper is supported; Fig. 5 shows a section through the bracket, the parts being separated from each other to some extent; and Fig. 6 shows a plan view of the bracket with the parts also separated.

In the drawings, I have illustrated a single disk-plow provided with the mold-board scraper or furrow turner of my invention, and also the adjustment bracket for positioning it at different heights up and down, as I may desire to turn a greater or less layer or portion of the furrow slice. It will be understood that I show only a single plowing-disk for the reason that in a gang-plow the elements of this invention would simply be repeated a desired number of times while an ordinary single plow would comprise only a single one of these disks with its associated parts.

The numeral 7 designates a bracket or other element which in the present instance really constitutes the frame which supports the disk-plow. In the case of a gang-plow, however, a number of similar bars or brackets might be mounted on a common framework. The end 8 of this frame bar is outturned and constitutes a support for the bracket which carries the disk. This bracket 9 is secured to the bar in any suitable manner, as by means of bolts 10, and carries a disk mounting 11 at its lower end. The disk 12 is concavo-convex or dish-shaped and is mounted to rotate freely on the mounting 11. Reference particularly to Figs. 2 and 3 will show more perfectly the general angle at which the disk is set. Its inner edge 13 is set considerably forward of the outer edge 14, thus giving it a diagonal position; and its upper edge 15 is set considerably back or to the rear of its lower edge 16, thus giving it a backward incline from the vertical. The degree of the angle at which the disk is set will depend generally both upon the shape of the disk and the character of the soil in which it is to be used. The general direction of movement of the plow is shown by the arrow $a$ in Fig. 3.

By reason of the inclined set or position of the disk, it will be seen that the lower portion of the soil will be cut approximately from the point 16 of Fig. 2—that is, from the bottom or lower edge of the disk—and will rise and move upwardly, backwardly, and outwardly, as the disk advances, as shown by the arrows $b$ and $c$ in Fig. 1. Now, if no means were provided for regulating the amount of soil or the portion of the furrow slice to be turned or upset, it will be seen that all of the furrow slice, including the lowermost portion thereof, would be carried and delivered or upset by the disk practically on top, so that the bottom or subsoil would form the top or covering of the plowed ground and be thereby subject to the objection already mentioned, of leaving the "dead," unprepared, and non-fertile soil on the top, thus preventing the proper sustenance and growth of the plant life for which the field was intended. To prevent this, I have provided a mold-board scraper which simultaneously performs both the functions of cleaning the disk and of regulating or determining what thickness or portion of the furrow slice shall be turned over or upset. In the particular embodiment illustrated in the drawings, this means or device consists of the member 18, which, for convenience, I term a mold-board scraper. It consists of a curved plate having its lower edge inclining backwardly and upwardly from its lowest and most forwardly position point 20 to the outer edge of the disk, and having its upper portion curved or rolled forwardly with an increasing forward curvature to the outer edge 23, forming, in effect, a mold-board which performs both the office of a scraper, to keep the face of the disk clean and free from soil and other obstructive matter that might lodge on and clog the same, and of a mold-board, which turns and bends the upper portion of the furrow slice so as to upset it in the manner of a mold-board on an ordinary plow. As the disk advances through the soil, the furrow slice will tend to move upwardly substantially in the direction of the arrow $b$ of Fig. 1. It will encounter the lower edge of the scraper approximately at the point 20, and will then move outwardly in the general direction of the curved surface of the scraper toward the outer end of the same. As the furrow slice thus advances across the curving face of the scraper, its upper portion or layer will be turned over or upset by reason of the peculiar contour of such member, and, on account of the fact of the resistance of the scraper, the action will be equivalent to exerting a downward pressure on the upper portion of the soil to make it conform to the contour and curvature of the scraper. From this action it results that the top of the furrow slice cut by the disk cannot rise higher than permitted by the position of the upper curved edge of the scraper, and the bottom of the furrow slice being confined by the pressure of the furrow top against the scraper cannot rise or be carried to the surface and must pass by at its natural depth. Of course, the soil can move sidewise so as to work off in the direction of the arrow c of Fig. 1, but it cannot rise higher than the limit determined by the position of the scraper. The bending or turning over of the upper layer of the furrow slice as it is carried sidewise across the disk, while preventing its upward movement beyond the desired limit, is determined and assisted by the mold-board-like form or contour of the scraper. While a predetermined portion of the top of the furrow slice is turned over or upset by the mold-board scraper, the soil from the lower portions of the furrow simply moves sidewise without coming to the surface. This action of moving or displacing the soil from the lower portion of the furrow in a sidewise direction breaks it up and pulverizes it to a certain extent, so that the entire furrow slice is broken up. In other words, by combining the mold-board scraper with the furrow-opening disk, the entire furrow slice will be displaced laterally and broken up, but only the upper portion will be turned over or upset and brought to the surface.

As already stated, means are provided for raising and lowering the mold-board scraper with respect to the diameter of the disk, so as to determine what portion of the furrow slice shall be turned over or upset. To this end, the scraper is carried by a rod or bar 27, which has its lower end rigidly secured to the scraper approximately at its central portion. The upper end of the bar is adjustably carried by a suitable portion of the frame. In the present instance a bracket 28 is carried over from the bar 8, or from the bracket 9, and has its lower end 29 secured to the bar 8 or bracket 9. It carries on its upper end a bracket 30 having a downwardly depending cup-shaped portion 31, the cup face 32 of which is preferably corrugated or roughened. A yoke 33 has its outer edge 34 of suitable formation to seat within the cup of the portion 31 and is also preferably roughened or corrugated like the face 32. This yoke has notched lugs 35 and 36 arranged to receive the upper end of the bar 27 which carries the scraper. An eye-bolt 37 extends through the yoke and through the cup-member 31, having its eye encircling the bar which carries the scraper. By tightening up the nut or lock 38, the eye is drawn inward, so as to securely grip the bar 27 against the yoke, and, at the same time, to draw the yoke tightly into the cup-portion 31, so that it will be held securely against rotation. By referring particularly to Fig. 2, it will be seen that as the scraper is adjusted up or down on the disk, the bar 27 must swing with respect to the bracket 30. This swinging and simultaneous up and down movement of the bar are well accommodated by means of the bracket just described. It will be noticed, however, that as the scraper is raised or lowered, such raising or lowering is in a practically straight line as the observer faces the disk, as in Fig. 1.

To guard against accidents which might occur to the operator standing or riding on the gang-plank or platform of disk-plows when arranged in multiple series, I have provided the guard 39, as shown in Figs. 1, 2 and 3. This guard comprises a band or plate having its lower end 40 secured to the bar 27, and thence curving up substantially on or along the contour of the edge of the disk, as shown in Fig. 1, and having its upper end 41 secured to the bracket 28 which carries the scraper. By means of this guard, an operator is well protected from falling into contact with the sharp edge of the rotating disk should an accident happen to him while standing or moving on the platform or gang-plank while the plow is in operation.

I claim:

In an implement of the class described the combination with a concavo-convex disk having its concave face set toward the direction of movement, said disk being set at an angle to the line of draft and having its upper edge tilted backwardly, of a mold-board scraper set in engagement with the concave face of said disk, the lower engaging edge of said scraper being of arcuate formation, a stem rigidly connected to the scraper and extended upwardly therefrom in a direction substantially at right angles to the arcuate contact edge, a mounting for said stem to permit the stem and scraper to be set into different vertical adjustments with respect to the disk, said stem and mounting being relatively so positioned that the stem always lies at an angle with respect to the vertical and whereby the adjustments of the stem and scraper are in the direction of the length of the stem, and means permitting the lower end of the stem which carries the scraper to swing forwardly and backwardly, whereby as the stem and scraper are adjusted up and down the arcuate edge of the scraper may be maintained in contact with the concave face of the disk, the upper edge of the scraper extending forwardly away from the disk to limit the upward travel of the furrow slice along the face of the disk, said forwardly projecting portion lying substantially at right angles to the stem, whereby as the scraper is set into different up and down adjustments the arcuate edge of the scraper remains in contact with the disk, and whereby as said adjustments are secured the forwardly projecting portion of the scraper always remains tilted at an angle to the horizontal to permit the furrow slice to rise as it travels toward the edge of the disk.

CHARLES R. STEPHENS.

Witnesses:
T. C. BLANDING,
JAMES J. LAMB.

Copies of this patent may be obtained for five cents each, by addressing the "Commissioner of Patents, Washington, D. C."